Sept. 22, 1936.   M. VOGEL-JORGENSEN   2,055,131
AUTOMATIC WEIGHING MACHINE
Filed Jan. 8, 1935   2 Sheets-Sheet 1

INVENTOR
Mikael Vogel-Jorgensen
BY
Redding, Greeley & O'Shea
ATTORNEYS

Sept. 22, 1936.　　　M. VOGEL-JORGENSEN　　　2,055,131
AUTOMATIC WEIGHING MACHINE
Filed Jan. 8, 1935　　　2 Sheets-Sheet 2

INVENTOR
Mikael Vogel-Jorgensen
BY
Redding, Greeley & O'Shea
ATTORNEYS

Patented Sept. 22, 1936

2,055,131

UNITED STATES PATENT OFFICE 2,055,131

AUTOMATIC WEIGHING MACHINE

Mikael Vogel-Jorgensen, Copenhagen, Denmark, assignor to F. L. Smidth & Co., New York, N. Y., a corporation of New Jersey Application January 8, 1935, Serial No. 808 In Great Britain January 11, 1934

2 Claims. (Cl. 249—20)

This invention relates to automatic machines for weighing and discharging in bulk such materials as coal, cement, grain, or the like. Such machines commonly comprise a receptacle suspended from or supported directly or indirectly by the scale beam or platform of a weighing mechanism and into which the material to be weighed is delivered and from which it is discharged by a tilting or rotating or other movement of the receptacle. Usually, in such machines, the movement of the receptacle to discharge the weighed material is effected by an impulse delivered from outside the weighing mechanism; but desirable accuracy in weighing has not been found possible in such machines. The object in view in the development of the present invention has been to improve the construction of such automatic weighing machines in such manner as to make it possible to attain great accuracy in the weighing. In accordance with the invention the receptacle into which the material is discharged for weighing, preferably in the form of a drum provided with an opening through which the material is delivered to the drum, is rotated to effect the discharge of the material from the drum and is geared to the motor by which the drum is rotated, the motor and its associated devices being mounted on a carrier hung upon the same axis as the axis of the drum itself. The drum being supported by the weighing mechanism and moving downward as it is filled with the material to be weighed and the motor and other parts being supported on the same axis, the drum and the motor with its associated parts move downward together as the drum is filled and move up together when the drum has discharged its contents, the drum being rotated meanwhile to its initial position in readiness to receive another charge of material. The hopper through which the material is delivered to the drum is provided with a gate which is closed automatically when the correct weight of material has entered the drum and is opened again when the drum returns to its initial position after the material has been discharged therefrom. The downward movement of the drum and the associated parts, in the preferred embodiment of the invention, effects the closing of the electric circuit of the motor and of an electro magnetic device by which a brake is released from or applied to the drum simultaneously to the closing and opening of the circuit which supplies current to the motor. The hopper gate is actuated both for opening and for closing by mechanical devices operated in the movement of the drum.

The invention will be more fully explained hereinafter with reference to the accompanying drawings in which a convenient and practical embodiment is illustrated and in which—

Figure 2:
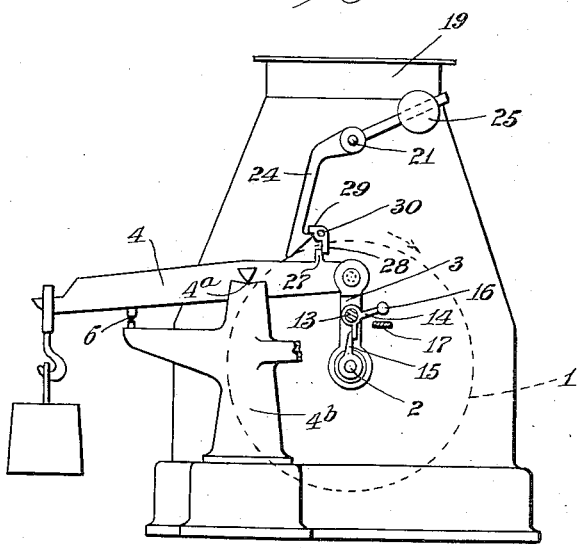
Figure 2 is a view of the same in end elevation as seen from the left hand in Figure 1 with the mercury switch removed and its shaft in section.
Figure 3:
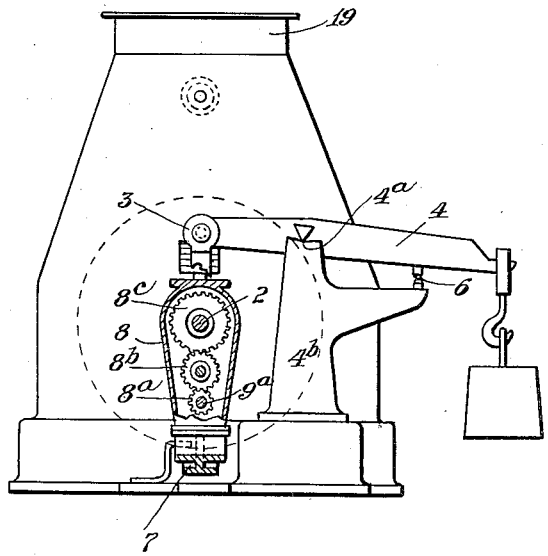
Figure 3 is a view of the same in end elevation and partly in section on the plane indicated by the broken line 3—3 of Figure 1 as seen from the right hand in Figure 1.
Figure 4:
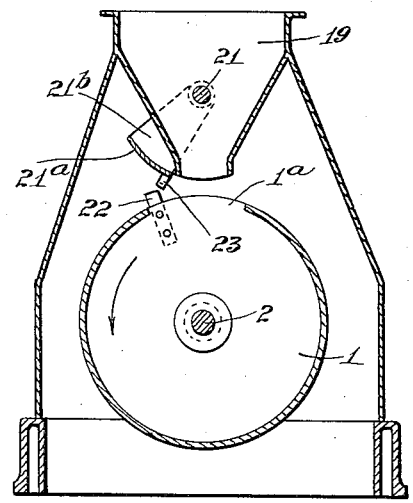
Figure 4 is a view in section on the plane indicated by the broken line 4—4 of Figure 1.

A container 1 to receive the material to be weighed, preferably in the form of a cylindrical drum, is secured to and rotates with a shaft 2 which is suspended by a link 3 at each end from a corresponding scale beam 4. Counterbalance weights are suspended from the ends of the scale beams on the other side of the fulcrum 4ª and are of such mass as to somewhat more than counterbalance the weight of the drum and its accessories while permitting the drum and its accessories to move downward from the position shown in Figures 2 and 3 when a predetermined weight of material has entered the drum. When the drum 1 is empty the scale beams rest on stops 6 on arms of the pedestals 4ᵇ on which the scale beams 4 are fulcrumed. An L-shaped carrier 7 is hung on the shaft 2 and therefore moves downward and upward with the drum 1, the shaft 2 being free to rotate in the carrier, the vertical portion of which forms a housing 8 for a gear train while the horizontal arm furnishes a support for a motor 9 and brake mechanism to be described. The shaft 9ª of the motor carries, within the housing 8, a gear 8ª which meshes with an intermediate gear 8ᵇ, which in turn meshes with a gear 8ᶜ on the shaft 2. The motor shaft 9ᵃ carries a brake disc 9ᵇ with which cooperate brake shoes 10 which are actuated through a link 10ᵃ, lever 10ᵇ and armature rod 11ᵃ of an electric magnet 11 supported on a bracket 11ᵇ secured to the housing 8 to move therewith. The weight of the motor and other devices supported by the carrier 7 and of the carrier itself is sufficient to restrain the carrier and the parts carried thereby from swinging too far even when current is supplied to the motor, such temporary yielding as takes place serving to cushion the motor in starting the drum 2 from a condition of rest.

Figure 5:
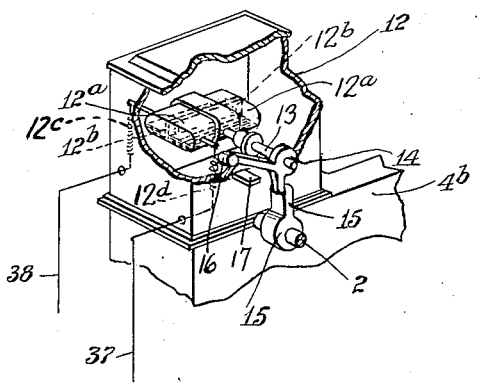
Figure 5 is a detail view in perspective on a larger scale, as seen from the right hand in Figure 1, showing particularly the mercury switch with its immediate connections the housing being broken away.
Figure 6:
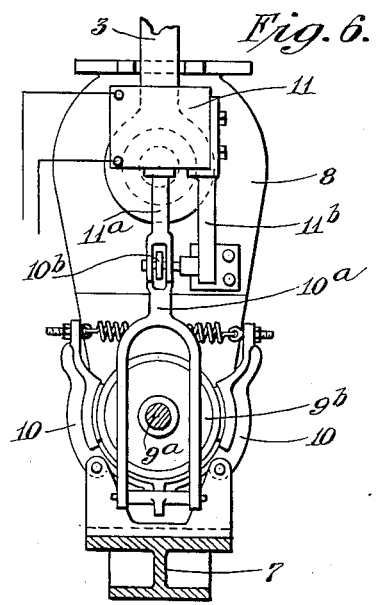
Figure 6 is a detail view on a larger scale and in section on the plane indicated by the broken line 6—6 of Figure 1, showing particularly the brake mechanism.

There is also supported in fixed position on a pedestal 4ᵇ at the other end of the machine a switch which serves to connect the wiring of both the motor 9 and the electromagnet 11 with the source of supply, the switch being of such character that it is operated to start the motor 9 and apply the brake 10 to the drum 1 when the drum 1 and its accessories move down under the influence of the predetermined weight of material delivered into the drum. The switch 12 is preferably a switch of the mercury type comprising a vessel 12ᵃ having a perforated partition 12ᵇ of insulating material. Bare electric terminals 12ᶜ and 12ᵈ are exposed within the chambers formed by the perforated partitions 12ᵇ within the body 12ᵃ of the switch and thereby, as is well understood in the operation of switches of this type, circuit is completed between the terminals 12ᶜ and 12ᵈ when the switch is tilted from the horizontal position shown in Figure 5. In the wiring diagram shown in Figure 1 one of the current supply wires, such as 32, is connected to the motor wiring by a branch 33 and to the magnet 11 by a branch 34. The return conductor 35 from the magnet 11 has connected thereto a return branch 36 from the motor and a common return 37 is connected to one of the terminals, such as 12ᵈ, of the mercury switch, while the other terminal, such as 12ᶜ, has connected to it the other supply conductor 38. Through the wiring connections described, or other suitable connections, current is supplied to the motor 9 and to the brake magnet 11 when the drum 1 and its associated devices move downward under the influence of a predetermined weight of material in the drum and when the drum has discharged its load and rises again the switch 12 is returned to its initial position, the circuit between the switch terminals is broken, and the supply of current to the motor and the brake magnet is cut off.

In order that the switch may be tilted when the drum moves downward, as described, provision is made whereby the switch is permitted to tilt under the influence of a counterbalance weight when the drum moves downward and is restored to horizontal position when the drum moves upward. In the embodiment of the invention shown the switch 12 is carried by a horizontal shaft 13 on which is secured a two-armed lever 14, one arm of which carries a weight 16 which, when the lever is permitted to swing, strikes a stop 17 and thereby limits the swinging of the lever and the tilting of the switch while the other arm, extended downward from the axis of the shaft 13, when the drum is in or near its highest position stands behind a stop 15 which is fixed at the end of the shaft 2 and, when the drum is in position to receive its load from the hopper and is in its highest position, stands in the path of movement of the two-armed lever and so prevents the lever from swinging on its axis and the switch from tilting to close the circuit.

Figure 1:
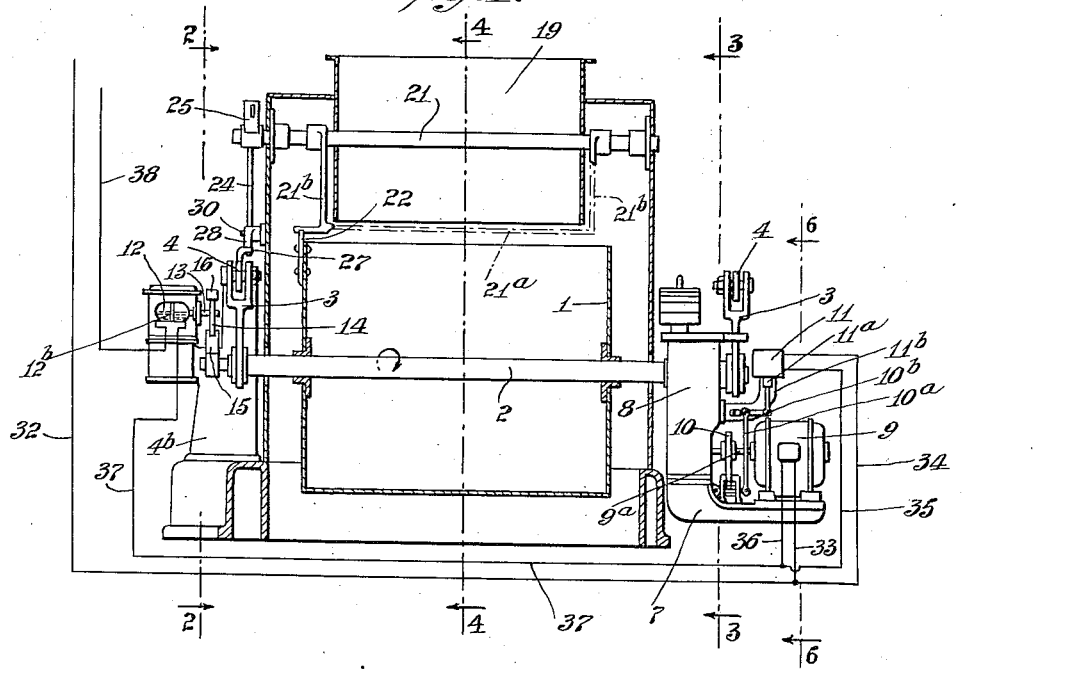
Figure 1 is a view in vertical sectional elevation, partly diagrammatic and partly in section, of a weighing machine in which the invention is embodied.

It will be understood that the shaft 13 is mounted in a fixed bearing in the switch housing and is in a fixed position with respect to the stop 15, so that when the drum moves downward under the influence of the predetermined weight of material the stop 15 moves down out of the path of the vertical arm of the two-armed lever 14 and permits the two-armed lever to swing on its axis and the switch to tilt from its horizontal position. This closes the circuit of the motor and of the brake magnet causing the motor to start and releasing the brake of the drum 1 at the same time so that the drum is rotated and permits the load to be discharged from the drum when the opening 1ᵃ of the drum is at or near its lowest position in the rotation of the drum. In the rotation of the drum the stop 15 passes beyond the lever 14 and when the drum has completed its rotation with the opening 1ᵃ uppermost the stop 15 again assumes the position shown in Figure 2 with respect to the two-armed lever 14, which is returned to its initial position while the switch is also returned to its initial position opening the circuit of the motor and the brake magnet, whereby the motor ceases to rotate the drum and at the same time the brake is applied to the drum to retain it in its initial position. The drum, as will be understood, is rotated in a clockwise direction as seen from the left hand in Figure 1 and as indicated by the arrow of Figure 1.

The material to be weighed is conveniently supplied to the receptacle or drum 1 through a hopper 19, the flow of material being controlled by a gate 21ᵃ carried by arms 21ᵇ of a shaft 21 mounted in bearings in the end walls of the hopper. A weighted arm 25 secured to the shaft 21, when released, swings the gate from the open position, shown in Figure 2, across the mouth of the hopper. Another arm 24, also secured to the shaft 21, is normally engaged so as to prevent closing movement of the gate, by one arm 29 of a dog pivoted at 30, the other arm 28 of which, when the drum is in its highest position, stands back of a stop 27 on the adjacent scale beam 4 whereby when the drum is in its initial position with its opening 1ᵃ also in its highest position, in readiness to receive the material from the hopper, the gate 21ᵃ is held in its open position while, when the drum moves downward, the stop 27 is moved out of the path of the arm 28 and the dog or detent, being then free to swing on its pivot, releases the arm 24 and permits the weighted arm 25 to swing the gate to closed position. To restore the gate to open position there is secured to the drum 1 a finger 22 which, as the rotation of the drum is completed, contacts with a finger 23, carried by the gate and so swings the gate to open position in which it is held by coaction of the arm 24, the detent 28, 29 and the stop 27 of the scale beam 4.

It will be understood that various changes in details of construction and arrangement can be made to suit different conditions of use and particularly that changes in the wiring of the motor and brake magnet and the switch can be made to suit different conditions, as when the current supply is of the 3-phase or alternating type or the motor is of the reversible type. The invention is not to be regarded as restricted, except as defined in the accompanying claims.

I claim as my invention:

1. The combination of a weighing mechanism, a receptacle supported by the weighing mechanism to receive the material to be weighed, a motor operatively connected with the receptacle to effect movement thereof to discharge the material therefrom, a switch operatively connected with the motor, a weighted lever carried with the switch and acting when released to shift the switch and close the connections to the motor, and means normally engaging the lever to prevent movement thereof and moving downward with the receptacle to disengage the lever.

2. The combination of a weighing mechanism, a receptacle supported by the weighing mechanism to receive the material to be weighed, a motor operatively connected with the receptacle to effect movement thereof to discharge the material therefrom, a mercury switch operatively connected with the motor, a shaft to support the switch, a weighted lever secured to the shaft and tending when released to tilt the switch, and a stop carried with the receptacle, normally engaging the lever to prevent tilting of the switch and moving downward with the receptacle to release the lever and permit tilting of the switch.

MIKAEL VOGEL-JORGENSEN.